Figure 1:
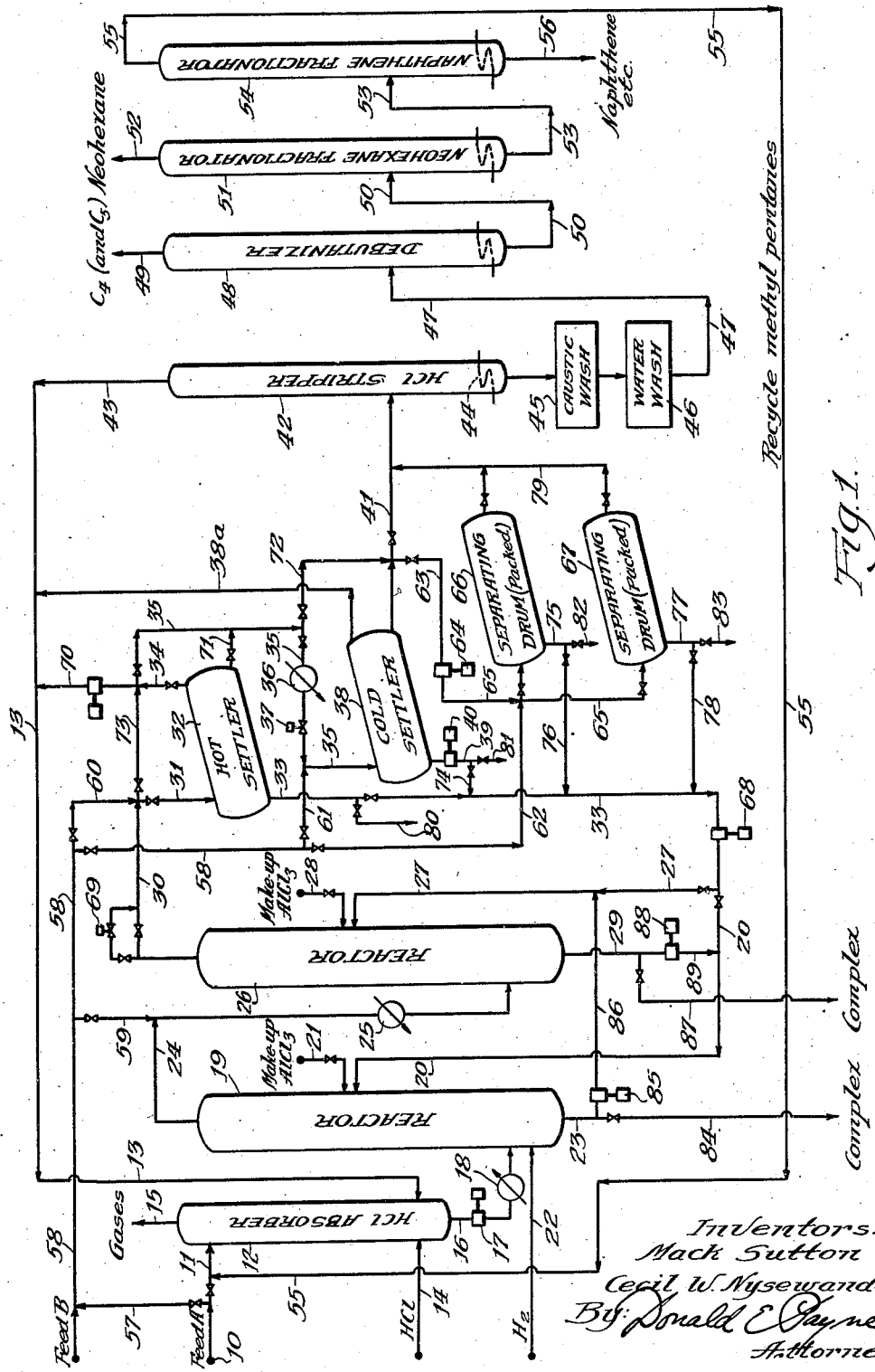

Patented Feb. 19, 1946

2,395,022

UNITED STATES PATENT OFFICE 2,395,022

ALUMINUM HALIDE HYDROCARBON CONVERSION SYSTEM

Mack Sutton, Hammond, and Cecil W. Nysewander, Highland, Ind., assignors to Standard Oil Company, Chicago, Ill., a corporation of Indiana Application March 31, 1943, Serial No. 481,252

13 Claims. (Cl. 260—683.5)

This invention relates to catalytic aluminum halide hydrocarbon conversion systems and it pertains more particularly to those parts of such systems which supplement the main catalytic conversion zone.

The conversion system as a whole may be for the purpose of effecting isomerization, alkylation, disproportionation, polymerization, cracking or any other hydrocarbon conversion or treating, but the invention is particularly applicable to systems for producing dimethyl butanes by a liquid phase conversion of hydrocarbons in the presence of a liquid aluminum halide-hydrocarbon complex catalyst (which may contain finely divided solid aluminum chloride) promoted by hydrogen chloride. This liquid phase conversion is preferably carried out in one or more tower-type reactors and the product effluent therefrom passes through one or more settlers or "guard chambers" to a hydrogen chloride stripper, after which it is neutralized and fractionated. It has been found that under many conditions of operation in such a system there are considerable catalyst losses caused by "carry-over" of aluminum chloride in the effluent stream. This catalyst carry-over not only involves loss of valuable catalyst material but it causes considerable difficulty in the operation of the system itself by fouling coolers and plugging lines, valves, etc. with what appears to be a solid or pasty mass of aluminum chloride together with various amounts of complex. An object of this invention is to avoid such catalyst losses and to prevent the operating difficulties incident thereto.

A further object is to increase the amount of conversion obtainable from a given amount of catalyst. Another object is to effect a pretreating of charging stock by means of carry-over catalyst, i. e., catalyst dissolved or entrained in a product effluent stream whereby deleterious components of said charging stock may be eliminated therefrom and from the system before the stock enters the main conversion zone. A further object is to minimize corrosion difficulties.

Aluminum chloride is soluble to a considerable extent in light hydrocarbons such as butanes and pentanes and to a lesser extent in such hydrocarbons as hexanes and heptanes. A liquid product stream consisting essentially of such hydrocarbons therefore tends to dissolve a certain amount of aluminum chloride in any conversion zone which contains free aluminum chloride as well as aluminum chloride-hydrocarbon complex. The effluent product stream from the conversion zone will then carry over such dissolved aluminum chloride to the settler or settlers and stripper. The aluminum chloride carry-over in an effluent product stream may amount to about .2 to about 1 pound per barrel of stock charged, an average carry-over being about .6 pound per barrel in the specific example hereinafter described. This is in excess of what would be expected based on solubility data and it indicates that in addition to dissolved aluminum chloride there is a considerable amount of finely divided aluminum chloride entrained, suspended or otherwise carried in the effluent product stream. When make-up catalyst slurry contains excessive amounts of fines e. g. more than about 50% passing a 150 mesh screen, the carry-over is considerably greater than when make-up catalyst of relatively uniform particle size is employed, e. g., about 10 to 150 mesh with less than 50% passing a 150 mesh screen. Avoidance of excessive fines in make-up aluminum chloride will minimize the carry-over problem but will not eliminate it.

It has been proposed to solve the carry-over problem by cooling the product effluent to sufficiently low temperature to precipitate dissolved aluminum chloride as a solid and then to filter out this solid and redissolve it in charging stock entering the system. The difficulty with such a proposal (aside from the undesirably low temperatures that would be required) is that such precipitated solids quickly plug a filter because of the cementing effect of complex which is inevitably present. In fact it seems that this complex actually deposits on tube walls and flows along with the product effluent stream, that solid aluminum chloride particles are picked up by this complex and that it is this phenomenon which causes the problem of valve and line plugging. An object of this invention is to avoid any attempt to filter aluminum chloride from an effluent stream.

In accordance with this invention the carry-over problem is solved by new and improved complex-formation and separation steps. After the product effluent stream leaves the main conversion zone and before it is discharged from the hydrogen chloride stripper (and preferably after the effective hydrogen pressure has been reduced) there is commingled with the effluent stream a hydrocarbon or other material which will react with any uncombined, dissolved or entrained aluminum chloride and convert it into a relatively insoluble and separable complex. A preferred hydrocarbon for this purpose is a light naphtha which contains components that are desirable in the main conversion step.

An example of such hydrocarbon additive is a virgin light naphtha of about 200° F. end point, which naphtha usually contains large amounts of naphthenes in the upper part of its boiling range. By introducing such a naphtha into the product effluent stream at a temperature within the approximate range of 100 to 300° F. and preferably at a pressure below 350 pounds per square inch in the presence of hydrogen chloride contained in said stream, the hydrocarbons in said stream will react with dissolved and entrained aluminum chloride to form a readily separable complex. At the same time the aluminum chloride and the newly formed complex tend to isomerize certain of the naphthenes to naphthenes of higher boiling range so that they can be readily removed from this naphtha by distillation before it is charged to the main isomerization reactor. By introducing such naphtha into the effluent product stream three important functions are accomplished:

(1) Carry-over aluminum chloride is converted into useful and separable form so that it may be recovered and returned to the main conversion zone, (2) Line plugging is avoided, and (3) A naphtha charge is pretreated for converting methyl cyclopentanes to higher boiling naphthenes prior to its fractionation so that excessive amounts of high boiling naphthenes are removed before such naphtha reaches the main conversion zone.

Another example of a complex-forming hydrocarbon for introduction into the effluent product stream is an olefin-containing or aromatic-containing light naphtha, e. g., a light naphtha produced by thermal or catalytic cracking, reforming, hydroforming, dehydroaromatization, etc. In this case the carry-over aluminum chloride in the effluent product stream may react with olefins or aromatics in the naphtha to form a complex which is readily removable but which is not so desirable for effecting the conversion in the main isomerization reaction zone. The complex in this case is therefore preferably withdrawn from the system and it may be used for some other purpose such as olefin polymerization, naphthene isomerization, etc. The olefins which do not enter into complex formation may be polymerized by the carry-over aluminum chloride or the complex produced therefrom and the resulting polymers may be separated from desired constituents of the isomerization charging stock by simple fractionation. Here again the practice of the invention not only effects an aluminum chloride clean-up in the effluent product stream but it enables the use of isomerization charging stock which would ruin the isomerization catalyst in the main conversion zone but for its treatment with the carry-over material in the effluent product stream.

Other examples of hydrocarbons for cleaning up the effluent product stream by reaction with dissolved or entrained aluminum chloride may include low boiling olefins, aromatics, alkyl aromatics, etc. Highly viscous oils and polymers however are not so desirable.

To facilitate the removal of the newly formed complex from the effluent product stream simple settlers may be employed. Due to the tendency for such complexes to deposit as a film on exposed surfaces, particularly effective separation may be effected by contacting said stream with the large surface areas that are provided by such materials as coke, aluminum or other metal turnings, beds of coarse sand. or any other "packing" or "contact" surfaces which are so arranged as to permit the complex to readily drain therefrom without interfering with the flow therethrough of the effluent product stream. Ordinarily filters of clay, fine silica gel, Celite, diatomaceous earth, etc. are not so desirable because of their tendency to become plugged and to thus creat undue pressure drops. The "run off" liquid from the collecting surfaces can either be withdrawn from the system or introduced into the main conversion zone depending upon the type of hydrocarbon which is introduced into the effluent stream.

In one embodiment of the invention the product effluent stream after suitable reduction of pressure is introduced directly from the conversion zone to the hydrogen chloride stripper and the complex-forming hydrocarbon is introduced into such effluent stream either before it enters the stripper or while it is passing therethrough. In this case the resulting complex may be separated from the stripped effluent stream before that stream is scrubbed with caustic and water preparatory to fractionation.

Figure 2:
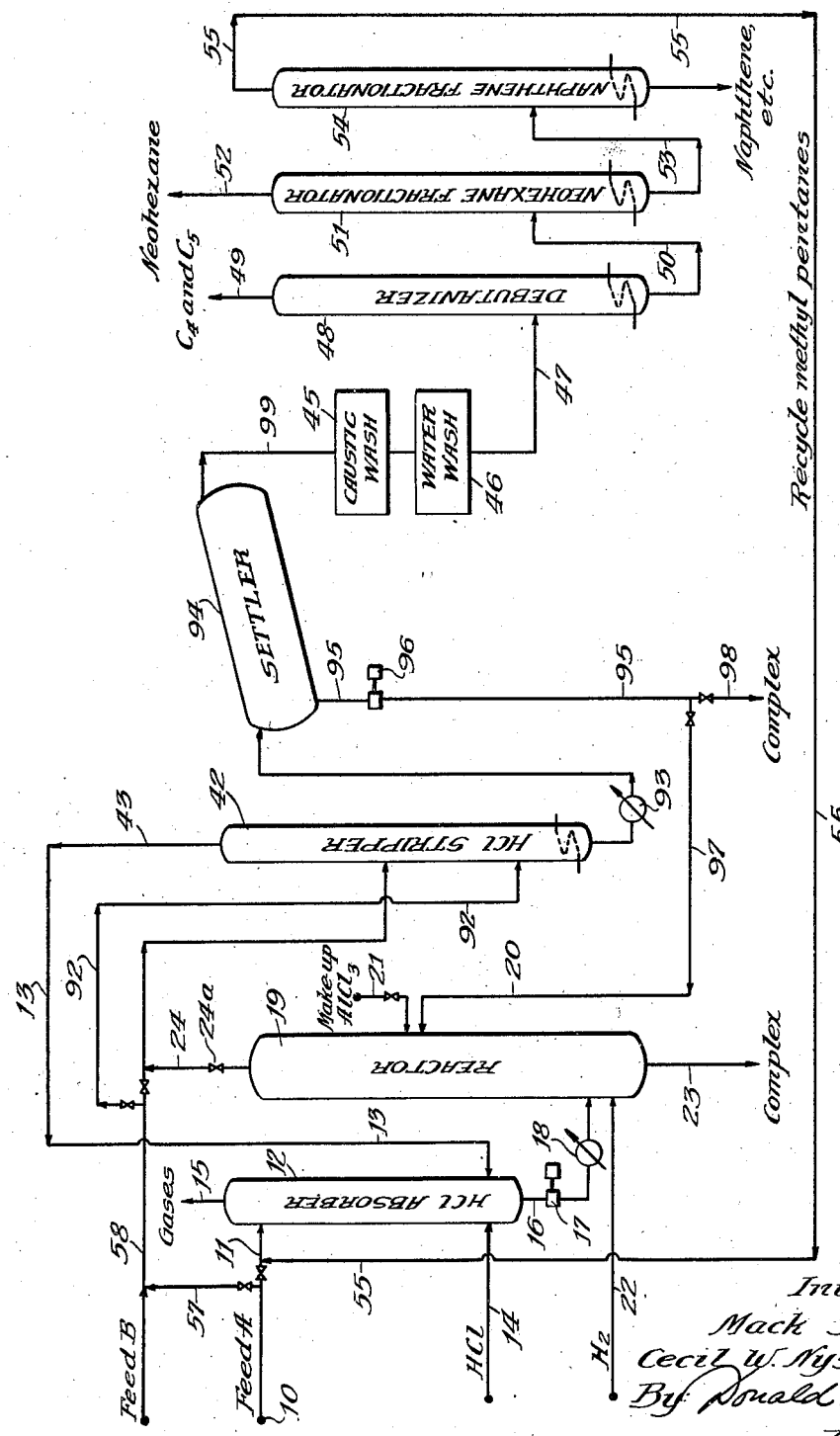

The invention will be more clearly understood from the following detailed description of specific examples read in conjunction with the accompanying drawings which form a part of this specification and in which:

Figure 1 is a schematic flow diagram of an aluminum chloride isomerization system illustrating clean-up of product effluent by complex formation of carry-over aluminum chloride before the effluent stream reaches the hydrogen chloride stripper and Figure 2 is a similar schematic flow diagram wherein the complex formation is effected in the hydrogen chloride stripper itself and wherein complex is separated from stripped products before they are treated with caustic.

Referring to Figure 1, the isomerization feed stock (feed A) from source 10 may be introduced through line 11 to hydrogen chloride absorber 12 which may be operated at a pressure of about 300 pounds per square inch and at a temperature of about 100° F. Recycle gases containing hydrogen chloride are introduced at the base of this absorber through line 13 and make-up hydrogen chloride may be introduced through line 14. Unabsorbed gases are removed through line 15. The charging stock, which may contain about 6% of dissolved hydrogen chloride, is withdrawn from the absorber through line 16 and forced by pump 17 through heater 18 into the lower part of tower 19 which may be about ½ to ¾ full of aluminum halide-hydrocarbon complex catalyst material introduced through line 20. This catalyst material may be formed in situ by aluminum chloride introduced through line 21 and make-up aluminum chloride may be continuously or intermittently introduced through line 21 either as a paste in complex, a slurry in oil or in any other convenient manner during the isomerization reaction. The composition of the catalyst material may be substantially as follows:

| | Per cent |
|---|---|
| Hydrocarbon content | 15–40 (e. g., 35) |
| Aluminum chloride content | 45–60 (e. g., 55) |
| Ferric chloride | 0–15 (e. g., 10) |

Such catalyst compositions are now well known in the art and they will require no further description.

Reactor 19 may be maintained under a pressure of about 850 pounds per square inch.

Hydrogen may be introduced through line 22 at the rate of about 180 cubic feet per barrel of stock charged. The conversion in reactor 19 may be at a temperature of about 275° F. and the space velocity may be about 1 volume of liquid charging stock per hour per volume of complex in the reaction. The superficial naphtha velocity through the tower may be of the order of 25 feet per hour.

Catalyst may be withdrawn from the base of the tower through line 23 at such a rate as to maintain the desired quantity of catalyst in the tower. Catalyst complex settles out of the upwardly flowing naphtha stream in the upper part of the tower and the effluent product stream leaves the tower through line 24 and cooler 25 to the second reactor tower 26 which may be operated at approximately the same pressure and space velocity but at a lower temperature, for example about 225° F. Complex may be introduced into this tower through line 27 and make-up aluminum chloride may be introduced as a paste in complex, a slurry in oil or in any other manner through line 28. Complex is withdrawn from the tower through line 29 at such a rate as to maintain the desired amount of complex in the tower.

The effluent product stream leaves the top of tower 26 through lines 30 and 31 to hot settler 32 which may be operated at substantially reaction pressure and temperature. Sufficient settling time is provided in settler 32 to permit the separation of any settleable carry-over complex material and the withdrawal of such settleable material through line 33. The remaining effluent product stream may leave the top of hot settler 32 through lines 34 and 35, cooler 36, pressure reducing valve 37 to cold settler 38 which may be operated at a temperature of about atmospheric to 100° F. and under a pressure which is sufficiently higher than the pressure in absorber 12 so that separated hydrogen and hydrogen chloride may pass directly through line 38a and line 13 to absorber 12 without the use of any compressor. Additional catalyst material may settle out of the effluent product stream in cold settler 38 and such catalyst material may be withdrawn through line 39 by pump 40. The effluent product stream may now pass through line 41 to stripper 42 which may operate at such pressure that the stripped gases may be returned through line 43 to line 13 and absorber 12 without the use of a compressor. The stripper may be provided with a suitable heating means 44 at its base and it may be operated with a top temperature in the vicinity of 140° F. and a bottom temperature in the general vicinity of 340° F.

The liquid product stream which is now substantially freed from hydrogen chloride is passed through a caustic wash system 45, a water wash system 46 and is then introduced by line 47 to debutanizer tower 48 which is operated under such conditions as to remove substantially all butanes and lighter components through line 49. If desired this tower may also remove pentanes in the overhead stream and the pentanes may be subsequently debutanized and separated into the iso and normal components the former being used as aviation blending stock and the latter recycled for isomerization with incoming charging stock.

The debutanized or depentanized stream from the base of tower 48 is passed by line 50 to neohexane fractionator 51 which is operated under such conditions as to take overhead through line 52 a product rich in neohexane. This product may also contain diisopropyl, cyclopentane and small amounts of other hydrocarbons and for some purposes it is desirable for it to contain the pentanes since the pentane fraction will consist chiefly of isopentane. The neohexane fractionator should be operated so that substantially all of the methyl pentanes and heavier hydrocarbons are withdrawn and from the base through line 53 and introduced into naphthene fractionator 54.

The naphthene fractionator separates an overhead stream boiling chiefly within the range of about 135° to 165° F. which stream is removed through line 55 and recycled to line 11 for further isomerization. It consists chiefly of methyl pentanes, normal hexane, and naphthenes of approximately the same boiling point. The higher boiling naphthenes, which are chiefly hydroaromatics (cyclohexane and methyl cyclohexanes), together with methyl hexanes, etc. are withdrawn through line 56. This stream is an excellent charging stock for the preparation of aromatics such as benzene, toluene and xylene by such well known processes as hydroforming or dehydroaromatization.

The fractionation system hereinabove described is highly schematic and it will, of course, be understood by those skilled in the art that suitable reflux means and reboilers will be employed in connection with all towers, that the order of fractionation may be reversed, that the degree or completeness of fractionation may be carried to any desired extent and that any known fractionation system may be employed for effecting the desired separation. Since the fractionation per se forms no part of the present invention it will not be described in further detail.

The isomerization system thus far described is already known to the art and it is likewise known that the operating conditions may vary through a considerable range. The temperatures in towers 19 and 26 may range from 150 to 350° F., the pressures may range from 500 to 1500 pounds per square inch, space velocities may range from about .4 to 4 volumes of charging stock per volume of catalyst per hour and the amount of hydrogen may range from about 50 to 250 cubic feet per barrel.

The charging stock (feed A) for this operation may be a debutanized light virgin naphtha of about 150 to 200° F. end point, it is substantially free from olefins and it preferably contains less than 2 or 3% of aromatics. It preferably contains about 5 to 15% of naphthenes but more naphthenes can be tolerated because of the naphthene elimination through line 56. The recycled stream introduced through line 55 may constitute the largest component of the charging stock introduced into towers 19 and 26 and in fact may constitute the only component of said charging stock as will be hereinafter described.

In the operation of the isomerization system thus far described, there is a tendency toward the fouling of coils in cooler 36, a plugging of lines 35 and 41 and of valve 37, etc. by carry-over aluminum chloride catalyst material which may range in consistency from a fluent to a solid pasty mass. This line plugging difficulty apparently arises because of aluminum chloride carry-over in the effluent product stream. The carry-over not only includes aluminum chloride actually dissolved in the effluent product stream but it includes finely divided aluminum chloride which is entrained or suspended in said stream. The problem of aluminum chloride carry-over is aggravated by the deposition of complex on the surfaces of tubes, condenser coils, etc. since this film of complex tends to pick up the carry-over aluminum chloride and to form the resulting pasty deposits. Heretofore such catalyst carry-over has not only caused considerable operating difficulty but it has resulted in considerable loss of valuable catalyst material.

In accordance with this invention dissolved or entrained aluminum chloride in the effluent product stream is converted into a readily separable liquid complex by introducing a complex-forming hydrocarbon into said effluent product stream. Such a hydrocarbon may be a light naphtha produced by thermal or catalytic cracking or by the dehydroaromatization or hydroforming of naphtha. It may be a normally liquid olefin hydrocarbon or, in fact, any hydrocarbon which will react with carry-over aluminum chloride to form a readily separable liquid complex. The point at which said complex-forming hydrocarbon is introduced into the system and the deposition of the resulting complex will depend to a considerable extent on the type of hydrocarbon introduced.

Assuming that the introduced hdrocarbon is part or all of the main isomerization charging stock (feed A), it may be passed by line 57 and line 58 either through line 59 to the effluent product stream in line 24, through line 60 to the effluent product stream in line 30, through line 61 to the effluent product stream in line 35 or through line 62 to an effluent product stream which leaves cool settler 38 through line 63 and is introduced by pump 64 and line 65 to packed separating drum 66 or 67.

It may be desirable to introduce this complex-forming hydrocarbon through line 59 when the make-up aluminum chloride is being introduced to the system through line 21 to tower 19 and when no make-up aluminum chloride is being introduced from line 28 to tower 26. In this case the incoming charging stock forms separable complex with carry-over catalyst after it leaves the main conversion zone in tower 19 and before it reaches the complex settling system. If there is any appreciable amount of uncombined aluminum chloride in tower 26 and particularly if this aluminum chloride is in extremely finely divided form, it may be preferable to introduce the feed stock to the effluent product stream entering hot settler 32 through line 31 although it should be understood that line 60 may lead directly to settler 32. The high temperature prevailing in settler 32 is conducive to complex formation. In this case the complex removed by line 33 may be returned by pump 68 either through line 20 to tower 19 or through line 27 to tower 26.

High hydrogen pressures tend to retard complex formation and to obtain the maximum clean-up in the hot settler it should be operated at reduced pressure. Thus instead of using pressure reduction valve 37 in line 35 such a valve 69 may be employed in line 30, hydrogen and hydrogen chloride may be withdrawn from the top of the hot settler through lines 34 and 70 and the remaining product effluent may leave the hot settler through line 71. The carry-over aluminum chloride clean-up in the hot settler may thus be sufficiently complete so that the product effluent from line 71 may pass through lines 72 and 41 to the stripper 42 thereby eliminating the use of the cool settler.

Alteratively the high temperature settler may be eliminated by introducing the complex-forming hydrocarbon through line 60 to the effluent product stream in line 30 and then introducing the resulting stream through line 73 directly to line 35. In this case or in the case where the complex-forming hydrocarbon is introduced through line 61 the clean-up will be effected in cool settler 38 and the resulting complex can be returned through lines 39 and 74 and 33 for introduction by pump 58 into either tower 19 or 26.

To facilitate the removal of newly formed complex a separating chamber may be provided with suitable packing or with an inert material of relatively large pore size so that it will not be easily plugged. Lumps of coke, coarse sand, aluminum or other metal turnings or equivalent material may be used for such packing, such material being defined in the accompanying claims by the expression "permeable mass containing large agglomerating surfaces." The complex-forming hydrocarbon may be introduced through line 62 to an effluent product stream entering such a packed settling chamber 66 or 67. The complex will adhere to the exposed surfaces in this settler and will run down said surfaces for removal through lines 75 and 76 or 77 and 78 to line 33, pump 68 and lines 20 or 27 for return to towers 19 or 26. The effluent product stream thus freed from complex may be passed by line 79 to the hydrogen chloride stripper 42. While separate packed towers 66 and 67 are illustrated in the drawings it should be understood that such packing material may be used instead in settlers 32 or 38. A plurality of such packed towers is preferably employed so that one may be washed free of complex while another is on-stream when the complex run-off is not sufficiently rapid to make the washing step unnecessary. The wash liquid may be charging stock and it may be introduced directly into tower 19 or tower 26. To avoid unduly complicating the drawings such wash lines have not been shown.

When the complex-forming hydrocarbon contains olefins or other components which might result in the formation of a complex which is undesirable in towers 19 or 26, it may be introduced through line 58 and through branched lines 60, 61 or 62. In this case the resulting complex should be discarded from the system although it may be used in another system for polymerizing olefins, isomerizing naphthenes or other treatment of hydrocarbons. If the olefinic complex-forming hydrocarbon is introduced through line 60 then the complex withdrawn through line 33 should be discarded through line 80. By introducing such olefinic complex-forming hydrocarbon through line 61 the complex from line 33 may be returned to towers 19 or 26 and the newly formed complex can be discarded through line 81. By introducing the olefinic complex-forming hydrocarbons through line 62 it is possible to recycle to the towers 19 and 26 both the complex from line 33 and from line 74, the undesirable complex in this case being withdrawn from the system through line 82 or line 83.

In the system hereinabove described two reaction towers 19 and 26 have been illustrated but it should be understood that a single tower may be sufficient or that more than two towers may be employed. The complex from the base of tower 19 may be either withdrawn from the system through line 84 or returned by pump 85 and lines 86 and 27 to tower 26. Similarly, the complex in the base of tower 26 may be discarded through line 87 or it may be passed by pump 88 through lines 89 and 20 to tower 19.

In Figure 2 the drawings have been simplified by showing only a single conversion tower but here again it should be understood that any number of such towers may be employed. The distinguishing feature of the system illustrated by Figure 2 is the elimination of settling or separation chambers between the conversion zone and the hydrogen chloride stripper and the introduction of the complex-forming hydrocarbon into the effluent product stream entering the stripper or into such stream which has already been introduced into the stripper. Thus the complex-forming hydrocarbon from line 58 may be commingled with the effluent product stream from line 24 (which will be provided with a suitable reducing valve, if necessary, to bring the pressure down to at least about 300 to 350 pounds per square inch). The combined stream may be introduced through line 91 into hydrogen chloride stripper 42. On the other hand the effluent product stream may be introduced into the stripper through lines 24 and 91 and the complex-forming stream may be introduced through line 92 to a lower point in the stripper. The high temperatures and the removal of hydrogen in the stripper are both conducive to complex formation and substantially all of the carry-over aluminum chloride is thus converted into complex before it leaves the stripper. The product stream from the stripper may pass through cooler 93 to settler 94 and the removed complex may be withdrawn through line 95 by pump 96. If the complex-forming hydrocarbon is paraffinic or naphthenic so that it produces a complex of high activity for the isomerization reaction, this settled complex from line 94 may be introduced through line 97 and line 20 back to tower 19. On the other hand, if the complex-forming hydrocarbon is olefinic or otherwise of such nature that the resulting complex is not suitable for isomerization, then the complex may be withdrawn from the system through line 98.

After settling out complex from settler 94 the product stream is neutralized with caustic, water washed and fractionated. It should be understood that suitable packing material may be employed in settler 94, that a plurality of such settlers or separation chambers may be employed in series or in parallel and that other known means may be employed for separating the newly formed complex from the effluent product stream.

While the invention has been described in connection with a particular aluminum halide conversion system, isomerization of light naphtha with aluminum chloride-hydrocarbon complex catalyst, it should be understood that the invention is equally applicable to the isomerization of other hydrocarbons, such as butane, pentane, etc. to the use of aluminum bromides as well as aluminum chlorides and equivalent complex-forming catalyst material, and to such processes as alkylation, disproportionation, cracking, polymerization, or, in fact, any aluminum halide conversion system wherein catalyst carry-over constitutes a serious problem.

The complex-forming material (feed B) is preferably a hydrocarbon of the type hereinabove described but it should be understood that other complex-forming materials may be used instead of or in addition to hydrocarbons. Nitrobenzene, for example, forms complexes with aluminum chloride and small amounts of nitrobenzene may thus be introduced through line 58 for effecting the aluminum chloride clean-up in the effluent product stream. In fact there may be a considerable number of chemical compounds particularly substituted hydrocarbons, aldehydes, ketones, esters, ethers, etc. which have the property of forming readily separable complex with such carry-over aluminum chloride and which at the same time will not produce too serious a problem with regard to separation of such added material as may be dissolved in product streams. The particular advantage of using hydrocarbons as complex-forming materials is that such hydrocarbons may be converted into more valuable forms or rendered suitable for isomerization charging stock in a recycle stream. The particular examples hereinabove set forth are by way of illustration and not by way of limitation. Various other operating conditions sequences of steps, modifications and alternatives, etc. will be apparent to those skilled in the art from the above detailed description.

We claim:

1. In an aluminum halide hydrocarbon conversion system wherein a liquid product effluent stream from a conversion zone contains a hydrogen halide and substantial amounts of uncombined aluminum halide, the method of operation which comprises introducing into said effluent stream a normally liquid complex-forming hydrocarbon which is substantially free from olefins and which will react with said uncombined aluminum halide to form a readily separable complex, effecting the formation of such complex, and separating said complex from said effluent product stream, and introducing said separated complex to said conversion zone.

2. The method of claim 1 wherein the complex is separated from the effluent stream by contact with a permeable mass containing large agglomerating surfaces.

3. In a catalytic aluminum halide-hydrocarbon conversion system wherein a hydrocarbon is contacted with aluminum halide catalyst in the presence of a hydrogen halide activator in a conversion zone and an effluent product stream from the conversion zone is subsequently passed through a hydrogen halide stripper before being neutralized and fractionated and wherein said effluent product stream contains carry-over aluminum halide, the method of operation which comprises commingling a normally liquid complex forming hydrocarbon which is substantially free from olefins with said effluent product stream before said stream leaves said hydrogen halide stripper, effecting complex formation by reaction of said carry-over aluminum halide and said complex-forming hydrocarbon in the presence of said hydrogen halide activator, and separating said complex from said effluent product stream.

4. The method of claim 3 wherein the complex separation is effected before said stream enters said stripper.

5. The method of claim 3 wherein the complex separation is effected after said stream leaves said stripper.

6. The method of claim 3 which includes the step of passing said effluent stream through a high temperature settling zone at a temperature in the range of 150° to 350° F. before it enters said stripper and wherein complex formation is effected in said high temperature settling zone.

7. The method of claim 3 which includes the step of passing said effluent stream through a low temperature settling zone at a temperature not substantialy higher than 100° F. before it enters said stripper and wherein complex formation is effected in said low temperature settling zone.

8. The method of claim 3 wherein the conversion zone is maintained under a substantial hydrogen pressure and which includes the steps of reducing the pressure of said effluent product stream and removing hydrogen therefrom and wherein complex formation is effected with carry-over catalyst in said effluent product stream under said reduced hydrogen pressure conditions.

9. In a catalytic aluminum chloride light naphtha isomerization system wherein a light naphtha fraction is contacted with an aluminum chloride catalyst in the presence of a hydrogen chloride activator in a conversion zone under substantial superatmospheric hydrogen pressure and the effluent product stream from the conversion zone is subsequently passed through a hydrogen chloride stripper before being neutralized and fractionated and wherein said effluent product stream contains carry-over aluminum chloride, the method of operation which comprises introducing a normally liquid complex-forming hydrocarbon substantially free from olefins into said effluent product stream before said stream leaves said hydrogen chloride stripper, effecting complex formation by reaction of said carry-over aluminum chloride and said complex-forming hydrocarbon and separating said complex from said effluent product stream.

10. The method of claim 9 wherein the complex-forming hydrocarbon is the light naphtha fraction which is to be contacted in the conversion zone and wherein light and heavy components of said fraction are removed therefrom after said complex formation and before said fraction enters said conversion zone.

11. The method of claim 9 wherein said separated complex is introduced into said conversion zone.

12. In the process of isomerizing a saturated hydrocarbon boiling within the butane to hexane boiling range, the improved method of operation which comprises introducing said hydrocarbon together with added hydrogen chloride at a low point in a column of liquid aluminum chloride-hydrocarbon complex catalyst, passing said hydrocarbon upwardly through said column at an isomerization temperature within the range of 100 to 300° F. under a pressure to maintain the hydrocarbon in liquid phase and at a rate to effect substantial isomerization, separating liquid product from complex in a settling zone above said complex column and returning separated complex directly to said column, withdrawing liquid product from the isomerization zone after said complex separation step said product stream containing carry-over aluminum chloride catalyst material, introducing said liquid product into a large settling zone, contacting said liquid product in said settling zone with a normally liquid complex-forming hydrocarbon and allowing sufficient residence time in said settling zone to permit reaction of said complex-forming hydrocarbon with carry-over aluminum chloride contained in the product stream, separating the resulting complex from the product stream, stripping hydrogen chloride from said stream, neutralizing said stream after the stripping step and fractionating said stream after the neutralizing step to separate a product isomer fraction from higher boiling and lower boiling fractions.

13. The method of claim 12 which includes the step of separating the resulting complex from the product stream after the contacting step by passing the product stream as a liquid through a separation zone in contact with a non-adsorptive contacting material comprising a permeable mass containing large agglomerating surfaces.

MACK SUTTON.
CECIL W. NYSEWANDER.